United States Patent
Hübinger et al.

[11] Patent Number: 6,076,362
[45] Date of Patent: Jun. 20, 2000

[54] PROCESS AND APPARATUS FOR COOLING A CONTINUOUSLY INFLOWING LIQUID IN VACUO

[75] Inventors: Wolfgang Hübinger, Limburgerhof; Walter Holtrup, Frankenthal; Jochen Kessler, Hassloch, all of Germany

[73] Assignee: BASF Aktiengesellschaft, Ludwigshafen, Germany

[21] Appl. No.: 09/186,478

[22] Filed: Nov. 5, 1998

[30] Foreign Application Priority Data

Nov. 5, 1997  [DE]  Germany .......................... 197 48 886

[51] Int. Cl.[7] ...................................................... F25D 21/12
[52] U.S. Cl. ..................... 62/82; 62/100; 62/78; 62/62; 62/63
[58] Field of Search .................... 62/62, 63, 78, 62/100, 86

[56] References Cited

U.S. PATENT DOCUMENTS

| 4,378,317 | 3/1983 | Seguine ................................... 260/428 |
| 4,399,236 | 8/1983 | Niederdellmann et al. ............... 521/49 |
| 4,533,432 | 8/1985 | Goldmann et al. ..................... 159/47.1 |
| 4,772,757 | 9/1988 | Lailach et al. ........................... 568/939 |
| 5,696,305 | 12/1997 | Klinger et al. .......................... 568/934 |

OTHER PUBLICATIONS

Marr et al., Die Auslegung von stehenden . . . , 379–382.
MuschelknautZ (VDI,Warmeatlas[VDI thermal atlas] vol. 9–10, 7th Ed, 1994).

*Primary Examiner*—Henry Bennett
*Assistant Examiner*—Mark Shulman
*Attorney, Agent, or Firm*—Keil & Weinkauf

[57] ABSTRACT

A process for cooling a continuously inflowing liquid, in particular a dispersion, in vacuo which comprises subjecting the liquid to a flash evaporation in a separator.

5 Claims, 1 Drawing Sheet

PROCESS AND APPARATUS FOR COOLING A CONTINUOUSLY INFLOWING LIQUID IN VACUO

The invention relates to a process and an apparatus for cooling a continuously inflowing liquid in vacuo. Such liquids are dispersions, suspensions, emulsions or solutions. Dispersions must be cooled to temperatures below 35 degrees Celsius for storage, so that they do not separate or form skins on the liquid surface. Because of the high heat capacity of about 3 kJ/kg/K, the shear sensitivity of the dispersions, and their elevated viscosity, cooling is difficult and time-consuming. In a high-productivity dispersion plant, however, cooling a batch must not prolong the total cycle time. It must therefore proceed as rapidly as possible, preferably within a period of less than one hour.

Dispersions are generally cooled to date in stirred tanks having jacket cooling. In the case of batch sizes above five tons, as are now customary, owing to the low available heat-transfer surface area of a tank of this type, the cooling time is prolonged and is frequently several hours. Therefore, a change has already been made to shifting cooling to external apparatuses. Here, especially, separate heat exchangers such as plate heat exchangers or spiral heat exchangers have been used. The disadvantage of these apparatuses is a relatively high mechanical requirement, in particular in the case of the unavoidable cleaning operations. Furthermore, the efficiency is poor in the case of relatively high-viscosity products.

These disadvantages are avoided by cooling in vacuo, which was originally developed for removing volatile organic compounds from dispersions. This process does not lose its efficacy, even in the case of relatively high-viscosity products. In addition, it also has a markedly lower product-contact surface, which decreases the cleaning requirement. Furthermore, a stripping effect also occurs which reduces the volatile components from the dispersions and thus leads to a deodorization.

The disadvantage of such a vacuum cooling of dispersions is that foam is produced on outgassing. Therefore, the inlet nozzle is designed in such a manner that the foam is destroyed by means of a pressure jump on introduction into a separation vessel. However, this separation vessel needs to be relatively large, in accordance with its technical design as a separator having velocities less than 0.8 m/s. Its installation is correspondingly expensive.

It is an object of the present invention to avoid the above disadvantages and to provide a process for the continuous cooling of dispersions which can be carried out is with small equipment requirements.

We have found that this object is achieved by subjecting the liquid to a flash evaporation in a separation apparatus. The equipment set-up necessary for this is considerably smaller than the separators used for the known procedures. According to an advantageous development of the invention, the separator is arranged downstream of a stripping column and the liquid is subjected to the flash evaporation in a cyclone separator. Advantageously, the superficial gas velocity of the evaporating gas in the separator is greater than 0.8 m/s, in particular is in the range from 2 to 10 m/s.

Further details and advantages of the invention can be taken from the examples described below on the basis of FIGS. 1 and 2. In the drawings.

1. KNOWN PROCESS

Figure 1:
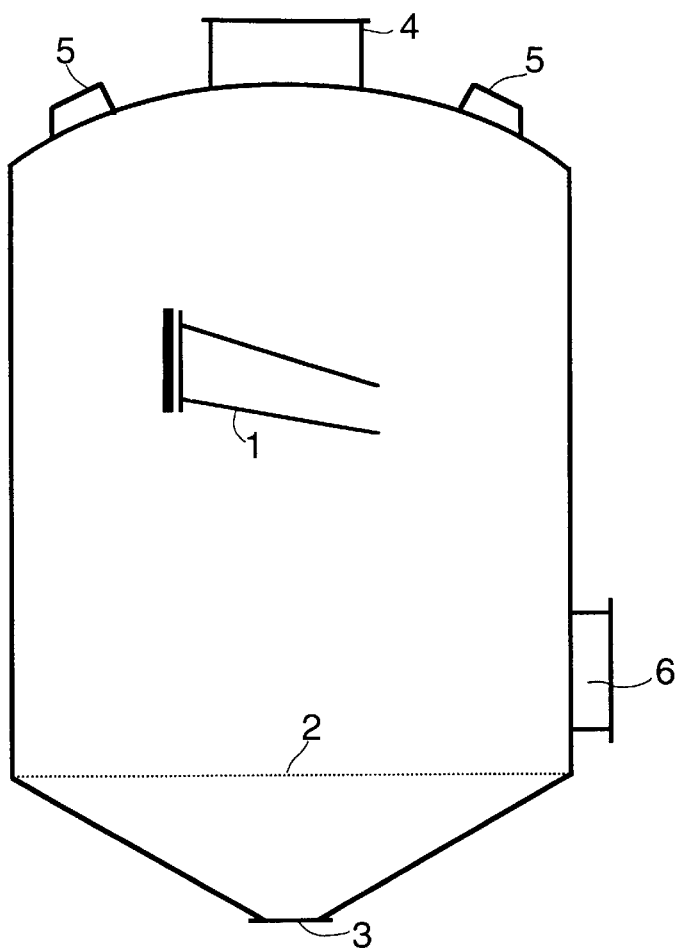
FIG. 1 shows a separator of known type

In a separator of known type, a product, for example a dispersion, is to be cooled from 67° C. to 35° C. For this purpose, this product is fed at 6 metric t/h into a separator of diameter 2.3 m via a nozzle 1. The separator is evacuated via a vapor tube 4 to a vacuum of 56 mbar absolute. During the cooling, approximately 255 kg/h of water evaporate from the dispersion, which are taken off at a superficial gas velocity of 0.45 m/s in the separator. The cooled product is taken off via the outlet orifice 3. During the cooling, skins which are sometimes formed are retained on a grating 2 and can occasionally be removed via a manhole 6. To monitor proper functioning, the separator is equipped with light and sight glasses 5. The throughput through the separator was then increased to 12 metric t/h of product as a result of a superelevation in capacity. This produced 510 kg/h of vacuum vapor. This mass flow rate led to a gas velocity in the separator of then 0.86 m/s. According to expert opinion, the limit for the separator is then achieved. The separator functions well in practical operations.

Check Calculation of the Plant Design

In the relevant literature (R. Marr, F. Moser: Die Auslegung von stehenden Gas-Flüssig- Abscheidem—Schwerkraft- und Gestrickabscheider [The design of vertical gas-liquid separators—gravity and fabric separators], Verfahrenstechnik, 9 (1975), pp. 379–382), a gravity separator for this throughput would have a markedly smaller diameter of $D=7.0*(\text{gas volumetric flow rate})^{0.5}/(\text{liquid density/gas density}-1)^{0.25}$. At 35° C. and a vacuum vapor flow rate of 510 kg/h, this is a diameter of $D=7.0*3.58^{0.5}/(25239)^{0.25}=1.05$ m.

A cyclone separator, in accordance with simplified design according to Muschelknautz (VDI Warmeatlas [VDI thermal atlas], volume 9–10, 7th edition 1994) would even have a diameter of only 0.73 m.

2. PROCESS ACCORDING TO THE INVENTION

Figure 2:
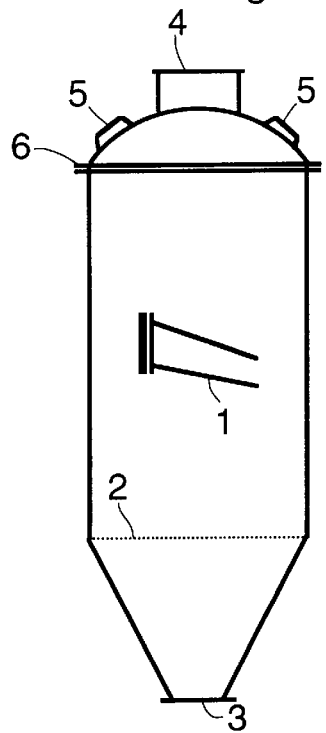
FIG. 2 shows a separator according to the invention on the same scale.

The process according to the invention is carried out in a separator as shown in FIG. 2. The reference numbers used there correspond to those in FIG. 1. The product, in the plant according to the invention, after a pretreatment in a deodorization column, arrives at the cooling at a higher temperature. At a throughput of 10–15 metric t/h, the product is to be cooled from 90° C. to 35° C. In this process 730–1100 kg/h of water evaporate from the dispersion.

In the design of the separator for vacuum cooling, a gravity separator was first designed according to Marr having:

D (for 15 metric t/h of throughput)=$7.0+7.68^{0.25}/(25239)^{0.25}=1.54$ m.

The apparatus was then designed as a cyclone separator according to Muschelnautz: $\tau(\text{vortex-finder tube})=(\text{gas volumetric flow rate}/\pi/(240/\text{gas density})^{0.5})^{0.5}=(7.68/\pi/(240+25.2)^{0.5})^{0.5}=0.177$ m, which gives D(apparatus)=6τ (vortex-finder tube)=1.06 m.

Both calculation models apply to the separation of solids or non-foaming liquids, that is they were not developed for dispersions which have a tendency to foam under vacuum operating conditions. Their applicability to the vacuum cooling of dispersions is accordingly rejected by the experts.

Because the product does not foam, owing to the pretreatment in the deodorization column, cooling in a cooling vessel designed as a cyclone separator having a diameter of only 1.0 m was performed experimentally. Under the operating conditions at a vacuum of 56 mbar in the separator, in the product flow rate of 15 metric t/h, a maximum superficial gas velocity of 9.8 m/s occurred, or approximately 12 times the velocity (0.8 m/s) recommended by the experts.

The separator surprisingly still functions at 12 times the recommended velocity and thus confirms the applicability to dispersions as well of the theoretical plant design calculations which had been drawn into doubt. The novel separator geometry having a diameter of 1.0 m thus represents a significant advance with respect to the overall volume of the apparatus and cleaning on changes of product in comparison with the previous design having an apparatus diameter of 2.3 m.

The height of the cylindrical part of the separator was only 1.5 m. The separator is thus significantly smaller than those known hitherto.

The advantages achieved with the process according to the invention are accordingly clear.

We claim:

1. A process for cooling a continuously inflowing liquid in vacuo which comprises subjecting the liquid to a flash evaporation in a separator arranged downstream of a stripping column, the liquid being subjected to the flash evaporation in a cyclone separator.

2. A process as claimed in claim 1, wherein the superficial gas velocity of the evaporating gas in the separator is greater than 0.8 m/s.

3. An apparatus for carrying out the process as claimed in claim 1, in which the separator is arranged downstream of a stripping column and, for flash evaporation of the liquid, a cyclone separator arranged after the stripping column is provided.

4. The process of claim 1, wherein the stripping column is a deodorization column.

5. The process of claim 2, wherein the superficial gas velocity of the evaporating gas in the separator is in the range from 2 to 10 m/s.

* * * * *